United States Patent [19]
Cutter et al.

[11] Patent Number: 5,659,994
[45] Date of Patent: Aug. 26, 1997

[54] BRAIDED FLYLINE

[75] Inventors: Vic Cutter, Lake Forest, Calif.; Danny R. Foote, Spirit Lake, Iowa

[73] Assignee: Berkley, Inc., Spirit Lake, Iowa

[21] Appl. No.: 563,122

[22] Filed: Nov. 29, 1995

[51] Int. Cl.$^6$ ................................................ A01K 91/00
[52] U.S. Cl. ................................................ 43/44.98
[58] Field of Search ............................ 43/44.98; 57/210; 87/9, 11

[56] References Cited

U.S. PATENT DOCUMENTS

| | | |
|---|---|---|
| D. 222,881 | 1/1972 | Martuch . |
| 816,226 | 3/1906 | Feder . |
| 1,427,330 | 8/1922 | Rousset . |
| 1,707,164 | 3/1929 | Karplus . |
| 1,982,304 | 11/1934 | Holden . |
| 2,164,296 | 6/1939 | Wilcox . |
| 2,250,832 | 7/1941 | Hedge . |
| 2,476,293 | 7/1949 | Hall et al. . |
| 2,748,525 | 6/1956 | Volz . |
| 2,885,303 | 5/1959 | Kaplan . |
| 2,922,798 | 4/1960 | Miller et al. . |
| 2,978,340 | 4/1961 | Veatch . |
| 3,030,215 | 4/1962 | Veatch et al. . |
| 3,043,045 | 7/1962 | Martuch . |
| 3,334,436 | 8/1967 | Cole . |
| 3,400,628 | 9/1968 | Herzog . |
| 3,486,266 | 12/1969 | Richardson et al. . |
| 3,512,294 | 5/1970 | Howald . |
| 3,523,034 | 8/1970 | Howald . |
| 3,653,143 | 4/1972 | Martuch . |
| 3,717,907 | 2/1973 | Klein . |
| 3,758,979 | 9/1973 | Martuch et al. . |
| 3,820,271 | 6/1974 | Martuch et al. . |
| 3,830,009 | 8/1974 | Collingbourne . |
| 3,841,015 | 10/1974 | Gregory . |
| 3,849,929 | 11/1974 | Martuch . |
| 3,868,785 | 3/1975 | Foote . |
| 3,914,480 | 10/1975 | Lang . |
| 3,936,335 | 2/1976 | Martuch . |
| 4,048,744 | 9/1977 | Chandler . |
| 4,321,854 | 3/1982 | Foote et al. . |
| 4,330,956 | 5/1982 | McCarthy . |
| 4,386,132 | 5/1983 | Dille et al. . |
| 4,593,599 | 6/1986 | Yeardley . |
| 4,640,179 | 2/1987 | Cameron . |
| 5,032,199 | 7/1991 | Landry et al. . |
| 5,207,732 | 5/1993 | Stark . |
| 5,296,292 | 3/1994 | Butters . |

FOREIGN PATENT DOCUMENTS

| | | | |
|---|---|---|---|
| 3140103 | 4/1983 | Germany | 43/44.98 |
| 0061944 | 5/1981 | Japan | 43/44.98 |
| 0016204 | 4/1985 | Japan | 43/44.98 |
| 898480 | 6/1962 | United Kingdom | 43/44.98 |
| 914216 | 12/1962 | United Kingdom | 43/44.98 |

OTHER PUBLICATIONS

Article on *Airflo Back to the Future* by Don Roberts, pp. 14–16, May–Jun. 92.

*Primary Examiner*—Kurt Rowan
*Attorney, Agent, or Firm*—Banner & Witcoff, Ltd.

[57] ABSTRACT

Composite flylines made with a core line, a polymeric coating over the core line for adjusting the line profile and density, and a braided layer over the polymeric coating. The braided layer provides strength without sacrifice in flexibility and provides a more cost efficient manufacturing process through the reduction or elimination of production scrap. An optional outer coating can be applied to further reduce surface friction, increase abrasion resistance, or provide coloring.

11 Claims, 1 Drawing Sheet

BRAIDED FLYLINE

FIELD OF THE INVENTION

The present invention relates to a new structure for lines used for flyfishing.

BACKGROUND OF THE INVENTION

Fish, especially trout, eat insects native to streams and lakes in which they live. One catching strategy is to use artificial flies that mimic the natural prey insects. Many of these insects are small and float on the surface. Certain considerations and techniques are required in fly fishing gear design for effective mimicking of natural insect activity.

One key consideration is the role and placement of weight. The artificial lures ("flies") used in flyfishing must be virtually weightless and the line must be designed to deliver the fly to the water surface with as gentle a landing as is performed by a real insect. Usually, a line is used that exhibits a multiple or compound taper. It tapers from a relatively larger diameter at the belly to a relatively small diameter at the tip. Other taper configurations are employed for affecting reel capacity, line reversibility, or casting performance.

Anglers also wish to mimic prey insects that could float as well as those that would sink. With the degree of precision required by expert fly angler, however, it was imperative that a line represented to be a floating line was actually able to float over the life of the line and that were supposed to sink would sink appropriately. Since few, if any, of the pre-1940 silk, linen, or horsehair-containing lines was able to float, the line surface was treated ("dressed") with wax, muscilin, or paraffin to make them water repellant. Because these early lines were susceptible to rotting and required routine cleaning, the integrity of the water repellant dressing was critical to the useful life of flylines.

In the 1940's, synthetic line materials became available. These new materials permitted new flyline opportunities. For example, the prior natural line dressings could now be replaced with an overcoat of synthetic buoyant materials that would not suffer the drawbacks of the natural dressing materials. Nylon lines were used for floating lines. Polyester was used for sinking lines.

Tapering the early lines was accomplished by a painstakingly labor intensive process based on splicing together fibers of reducing diameters to achieve the taper, e.g., Miller et al. U.S. Pat. No. 2,933,798. This process established a high price for such lines and taught line designers about the interactions among weight distribution, casting ease, and casting distance. All of the post-1940 lines were based on a central line for strength and flexibility with buoyant coatings to improve float characteristics. Although solid monofilaments were suggested as useful in some of the early patents, the need for core lines with low stretch, an air evacuation route, and minimum flexibility requirements dictated that hollow braids became the state of the art as the core for modern flylines.

Martuch U.S. Pat. No. 3,043,045 teaches the use of a level braided core covered by a tapering plasticized polyvinyl chloride ("plastisol") coating that contained glass microballoons to reduce the density of the plastisol. An adhesive primer was used to adhere the soft plastisol layer to the core line. See also, Richardson et al. U.S. Pat. No. 3,486,266 (glass microspheres in plastisol), Coilingbourne U.S. Pat. No. 3,830,009 (blown or gas-expanded plastic coating over a multifiber braided core), Lang U.S. Pat. No. 3,914,480 (incorporate tougher monomer into plastisol for increased abrasion resistance), and Martuch U.S. Pat. No. 3,936,335 (add foamed material to core under plastisol/microsphere coating).

Polymeric, buoyant coatings could be tapered by mechanical means to produce finished products in a heat cured process at or above about 300° F. and provided a number of options not previously available. Plasticizers tailored flexibility. Colors could be added with dyes and pigments. Lubricants could be added to the plastisol. High density metal powders could be added in place of glass microspheres for sinking lines.

FIG. 1 shows a typical prior art flyline. Braided core 1 typically measures about 0.018–0.030 inches (457–762 nm) and is chosen to maintain structural integrity throughout the curing process and provide the basic strength of the line. Adhesive layer 2 (sometimes referred to as a "primer") covers core 1 and is itself coated with polymeric overcoat 3. Overcoat 3 typically contains levels of glass microballoons of about 20–120 nm in diameter or a dense powder (e.g., rungsten) in a quantity to adjust the buoyancy characteristics of the flyline to float or sink at predesignated rates. Additionally, silicone lubricants are used to reduce surface friction, and coloring agents are added to adjust the appearance of the flyline.

Despite the better performance, the modern flylines still suffer a number of drawbacks and shortcomings. Some problems include:

1. Tip sinking in floating lines. Experience has shown that the core line must be a hollow braid. Heat used in the curing process for the plastisol expands any air around the core. Unless that air is allowed to vent through a hollow core, the gas expands into the plastisol and causes a bubble defect. Unfortunately, hollow braids inherently provide a surface into which water will wick thereby changing the density and causing the tip to sink. Braided core lines must be treated with waterproofing materials to resist wicking. Such coatings have had limited success, and tip sinking remains a major complaint of modern flylines.

2. Surface cracking. The glass microspheres commonly used do not bond well to the plastisol matrix. Sizing agent can help, but the constant flexing of the line during use results in cracks between the microspheres and the matrix. These cracks propagate with additional flexing thereby creating a "hinge" effect that affects "turnover" and casting performance. Water penetrates these cracks and worsens the sinking effects.

3. Limited durability. Plasticizers used to make the line sufficiently flexible to reduce surface cracking and facilitate casting also soften the polymer. The use of higher levels of glass microspheres for buoyancy also stiffens the line as well as increasing its tendency to crack. Each flyline is its manufacturer's compromise of durability, flexibility, buoyancy, and vulnerability toward cracking.

4. Memory. The adhesive used to promote the bond between the core and the plastisol allows relative movement when stored in a coiled state over time ("creep") thus giving what is known as a line "memory." Lines with memory are characterized by a coiled shape as the line leaves the reel. Because the line should unwind straight, fly angler often stretch their entire line lengths before each season to remove the line storage memory effect. Without adhesive, however, the normal plastisol coating can be readily removed from the core with relatively little effort. One commercial attempt to make lines of a polyaramid core and a polyurethane coating without an adhesive between the core and the coating exhibited excessive slippage between the core and the overcoat. Modern lines use adhesives requiring a balance between memory and durability as a critical compromise.

5. Surface friction. The normal, flexible plastisol has a relatively high degree of surface friction and casting resistance. A surface dressing is usually applied by either the manufacturer or the angler to lower the surface friction and improve casting distance. Although these surface dressings help, they also allow foreign material to adhere to the surface which can enhance abrasion and sinking problems. More flexibility means softer surfaces and increased durability and friction concerns.

6. Solvent effects. Plasticizers are frequently solvents that chemically attack the commonly used packaging materials. Relatively expensive spool and packaging materials must be used.

7. Relatively high scrap rates in premium flylines. The formulation of plastisol for flylines is as much of an art as a science. The plastisol viscosity varies with the formulation as well as with age of batch. Core braid irregularities may be seen in coated products. Core centering is critical and difficult. In addition, surface blemishes may lead to unacceptable lines. Unfortunately, scrap rates for flylines are fairly high due to such defects.

It would be desirable to have a flexible flyline that avoided, eliminated, or at least reduced the persistent problems with prior art flylines.

SUMMARY OF THE INVENTION

It is an objective of the invention to provide a line for flyfishing that reduces or eliminates the "memory" effects of storage in a coiled state on a reel.

It is another objective of the invention to provide a floating line for flyfishing that reduces or eliminates problems associated with changes in tip density with use.

A further objective of the invention is to provide a flyline and method of manufacture that is less expensive to manufacture than previous lines by reducing the scrap or defect rate during manufacture.

In accordance with these objectives and other objectives that will become apparent from the description herein, lines according to the invention include: (a) a core line of uniform diameter (and preferably free of an adhesive); (b) a first polymeric layer over said core line, said first polymeric layer exhibiting a cross sectional shape to provide a tapered line useful for flyfishing; and (c) an overbraid second layer covering said buoyant first layer, said second layer comprising a braid, weave, or twist of fibers made of an abrasion resistant material. Preferably, at least six fibers are used as the second layer.

Flylines according to the invention represent a fundamentally different structure for flexible flylines that reduces or eliminates the problems of memory, changes in tip density that affect the flotation characteristics of the line, and abrasion of the plastisol layer. The present flyline also experiences lower scrap rates during manufacture. This construction method also allows for the use of materials that modify the physical properties of the finished flyline.

DETAILED DESCRIPTION

Flyfishing lines according to the invention provide a radially disposed structure containing a core line, a polymeric coating over the core, a braid of fibers, preferably at least 6 fibers, over the polymeric coating, and optionally, a final outer coating over the braid. Notably, the present invention provides a flyline that can derive its strength from the braided outer layer rather than the core line which also provides protection for the polymeric layer from abrasion.

Figure 1:
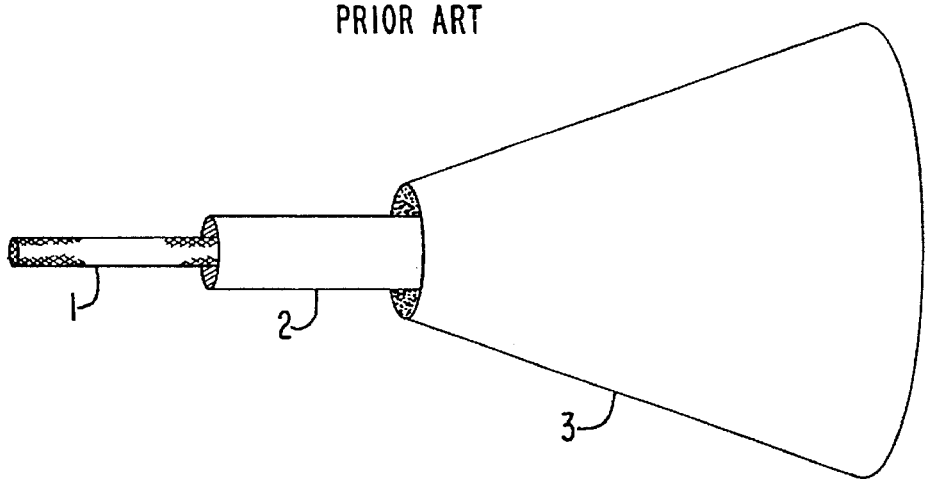
FIG. 1 depicts a typical prior art tapered flyline structure.
Figure 2:
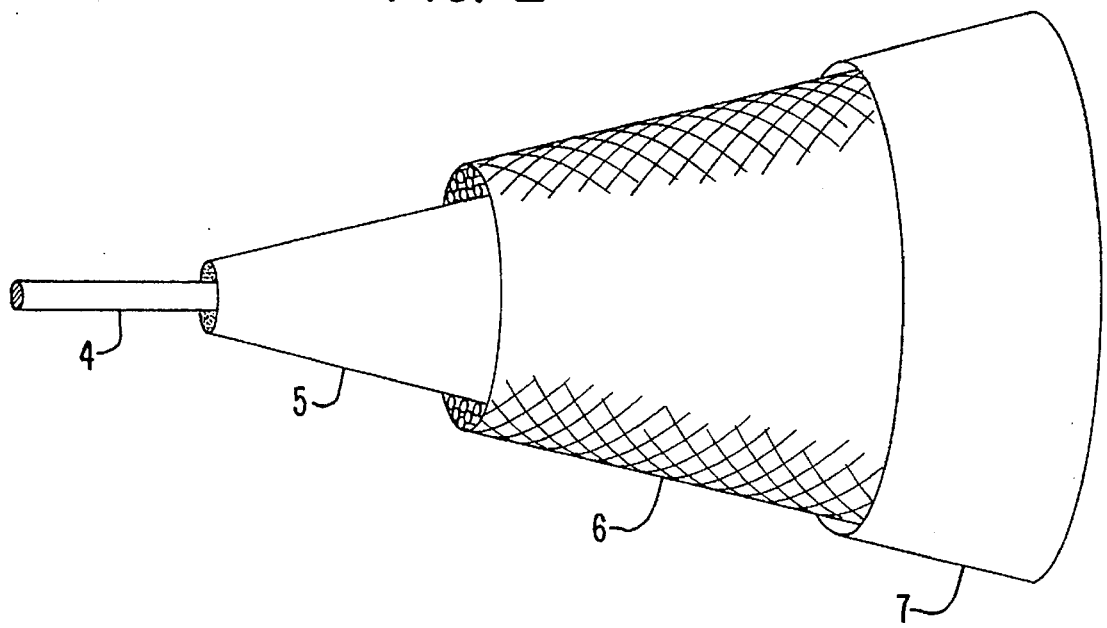
FIG. 2 illustrates a preferred flyline structure according to the present invention.

FIG. 2 is useful for understanding the structure of the present composite flyline. FIG. 2 depicts a composite flyline according to the invention. Core line 4 made of a single monofilament; a braid, twist, or series of parallel strands of one or more fibers of the same or different material; or a combination thereof is covered with polymeric layer 5 that may exhibit any profile useful for flyfishing. A tapered profile is depicted although it is not to scale. Braided layer 6 is formed over polymeric layer 5. Optional outer coating 7 can be added to modify one or more performance or aesthetic features of the flyline.

1. The Core

Materials used for the core line can be made of virtually any material that is able to withstand the elevated temperatures (at least about 150° C.) encountered in the curing process. Suitable materials for the core line include nylon; nylon copolymers or alloys; aramid fibers; polyesters; ultrahigh molecular weight polyolefins (such as those in Smith et al. U.S. Pat. Nos. 4,344,908 and 4,422,993 as well as Kavesh et at. U.S. Pat. No. 4,413,110, the disclosures of which are herein incorporated by reference), wire, and fluoropolymers.

The core line materials may be employed in any form of line permitted by the material employed. For example, the lines can be made in the form of braids whether hollow or about a central fiber, twisted filaments, parallel strands, or monofilament. The core line may also include a plurality of strands running parallel to the core axis or be made with multiple fibers, or blends of fibers having different dye characteristics for coloration effects and/or economy. Preferably, the core line exhibits a uniform diameter over its entire length.

The size of the core line is a diameter within the range from about 0.004" to about 0.020" (1–5 nm), preferably within the range from about 0.007" to about 0.013" (1.7–3.3 nm). The use of solid monofilament of nylon having a diameter within the range from about 0.008" to about 0.010" (2–2.5 nm) or 400–1000 denier fiber of nylon, aramid, or polyester are particularly preferred.

The core line is coated with a plastisol layer and is preferably free of any intermediate adhesive material that would contribute to the formation of a "memory" effect upon storage. The memory effects occur through a gradual relative creep between the core line and the plastisol during storage that does not immediately recover upon leaving the reel. As a result, even modern flylines benefit from periodic straightening.

A memory test includes some measurement of percent shrinkage after a period of time. One measurement of the magnitude of this memory effect is by wrapping a given length of composite line around a dowel with a diameter of about 0.875" (22 mm) under virtually no tension and held in the wrapped configuration for 24 hours. The line is then slid off the end of the dowel and allowed to hang freely. The coiled length of the line is then measured as a function of time relative to the initial line length. Typical lines have memory values within the range of about 25% to about 65% (i.e., they shorten to 25–65% of the original line length). After one hour, they recover to memory values within the range of about 12–20%.

2. The Polymeric Layer

The polymeric layer used as a coating over the core line can be virtually any material that will produce a flexible composite with low memory, in which the density can be adjusted relative to water for making floating and sinking lines, and that can be formed around the core line in a profile useful for flyfishing. Examples include polyvinyl chloride; polytetrafluoroethylene; thermoplastic polyurethane; or copolymers of polyethylenes, polypropylene, vinyl acetate, or mixtures thereof (e.g., a mixture of polyvinyl chloride and vinyl acetate). The preferred material is a conventional plastisol based on polyvinyl chloride (PVC) containing one or more plasticizers, dyes, additives, density increasing materials, or density reducing materials. See, Martuch U.S. Pat. No. 3,043,045; Richardson et al. U.S. Pat. No. 3,486,266; and Foote U.S. Pat. No. 3,868,785 the disclosures of which are herein incorporated by reference.

Particularly preferred additives include one or more plasticizers for flexibility and ingredients to adjust the density of the line. For example, the line can include: (a) buoyancy members, such as glass microballoons or other low density materials, in a quantity sufficient to make the composite line float; (b) high density powders, such as tungsten powder, in quantities sufficient to make the line sink at designated rates; or (c) a combination of glass microballoons and tungsten powder to make a line in which the tip sinks while the body floats. Neutral density lines (neither sinking nor floating) are free or substantially devoid of dense fillers (e.g., tungsten powder) or glass microspheres. Because the polymeric layer is protected from abrasion by the braided layer, higher levels of plasticizer and glass microballoons can be used for added flexibility and flotation characteristics.

Plasticizers are most preferably selected from those that are not cited as potentially carcinogenic. Various plasticizers produce flexible materials that vary in flexibility, memory, set, and permanence (low water extractability).

The polymeric layer can be formed over the core line in any profile that is useful for flyfishing. Most generally, the polymeric layer is formed with a tapering or non-tapering profile over at least some portion of the line length. Such shaped formation is performed by variable orifice devices or by combining variations in line speed and pumping rate of a coating device.

3. The Braided Layer

The braided layer is generally made from a number of fibers of an abrasion resistant material braided around the intermediate line containing the core line and the polymeric coating. The braided layer can provide strength to the resulting composite line, protect the polymeric coating from the effects of abrasion, and hide minor surface defects in the polymeric coating layer without adding memory effects to the composite. The use of an outer braid also acts as a separation barrier for the plasticizer used in the polymeric layer which can otherwise attack conventional packaging materials.

The braided layer is preferably made with at least four fibers, preferably at least six fibers. Although low numbers of fibers can be used, four fibers generally require relatively high braid angles to provide adequate coverage with an associated slow rate of production. The use of only 3 or 4 fibers also can result in a line surface that is not sufficiently smooth to "shoot" well in the cast. The use of at least six fibers of a relatively finer denier than those needed for braided lines of only four fibers will produce a flyline with a smoother surface. Indeed, lines made of high numbers of very free fibers would be very desireable. This trend is, however, tempered by the commercial realities of fiber manufacture and braiding techniques.

The use of at least 6 fibers of about 30–400 denier is preferred. A particularly preferred embodiment is the use of 8–64 fibers of 50–200 denier. Even more preferred is a braid made from 8–16 fibers of 50–100 denier.

The braided layer can be formed around the intermediate subassembly made of the core line and the polymeric layer with conventional braiding equipment and techniques. The braided layer can also employ a warp strand running in the braid parallel to the core. The warp strand, if used, may be made of the same materials as the braided layer or it may be different. Suitable materials for a warp strand include aramid fibers or gel spun polyethylene fibers.

The braid tightness should be adjusted to fall within the range from about 10 picks per inch to about 52 picks per inch. The braid tightness should be selected to provide a comfortable margin over the minimum tightness since overbraiding a tapered polymeric layer will produce variable braid tightness depending on the rate of diameter change in the polymeric line.

Materials used to make the fibers in the braid should be abrasion resistant and preferably also exhibit low friction and controlled stretch characteristics. Suitable materials include nylons, liquid crystal polymers, ultrahigh molecular weight polyolefins (particularly gel spun polyethylene and gel spun polypropylene), polyesters, and aramids. The preferred materials for the braided layer are nylons, polyesters, and gel spun polyolefins. Gel spun polyethylene is particularly preferred.

Gel spun polyolefins are well known and commercially available. See, Kavesh et at. U.S. Pat. No. 4,413,110; Smith et at. U.S. Pat. Nos. 4,344,908; Smith et at. 4,422,993; Kavesh et al. U.S. Pat. No. 4,356,138; Maurer EP 55,001; Harpell et at. U.S. Pat. No. 4,455,273; Kavesh et al. U.S. Pat. No. 4,897,902; Neal U.S. Pat. No. 5,277,858; and Kirkland et at. WO 94/00627. These fibers are generally made from linear polyethylene or polypropylene chains of a molecular weight of at least 400,000, a tenacity of at least 15 g/denier, a tensile modulus of at least 500 g/denier, a melting point of at least 140° C., have high abrasion resistance, low stretch, high toughness, good dimensional and hydrolytic stability, and resist creep under sustained loads. The fibers are opaque and white in appearance. Such fibers are commercially available from DSM, NV, Netherlands under the name DYNEEMA® and from AlliedSignal under the name SPECTRA®.

Because the braided layer is formed around a subassembly preferably based on plastisol-coated monofilament, the subassembly can be manufactured as a discrete intermediate product in a continuous formation process. This subassembly can then be stored for later use as feed into the inherently bitch process of braiding. The result is a shift from the manufacturing bottleneck away from the core formation to downstream steps. This will allow more efficient operation of the manufacturing line because this construction method reduces or eliminates centering problems in the polymeric coating unit, surface defects (blemishes, color variations, and coating contamination) are eliminated or covered up, and final product can be made in response to specific orders. If desired, stock plastisol-coated monofilament subassemblies can be overbraided with a clear, colored, or white braid.

The use of an overbraid layer also permits the manufacture of flylines with integral loops that would be available for use in connection to leaders or backing lines. Such loops are preferably formed by splicing the overbraid into loop or "eye" splices. Loops can be added and are preferably located at either end to facilitate connection to backing or leaders.

4. The Optional Overcoat Layer

If desired, the braided layer can be coated with an optional outer coating to adjust one or more functional or aesthetic characteristics of the flyline. Examples include the use of low friction outer coatings like silicone emulsions and wax coatings. Copolymers of ethylene-acrylic acid or polyurethane materials can be used as an abrasion resistant outer coating. Colored polymers or pigmentation can be added to modify the color and visibility properties of the line to suit a particular fishing need.

Flylines according to the invention can use mixtures of fibers in each of the core, braid, or overbraid layers. For example, gel spun polyethylene fibers can be used as core strands in addition to a braided monofilament.

The preferred line of the invention is made with a core of aramid fibers and an overbraid of nylon or gel spun polyethylene fibers.

EXAMPLES

Example 1

Samples of composite flylines according to the invention were made in 87 and 105 foot lengths with parallel strands of unbraided 200, 400, and 800 denier aramid fibers (KEVLAR® and TECHNORA®) as well as nylon monofilament and a plastisol formulation that is conventional except for the use of 5 phr (parts per hundred weight of resin) more of glass microballoons and plasticizer. Natural and pigmented formulations were used. The braided layer was made with 6, 8, 12, and 16 carrier braiders of: (a) 200 denier, 100 denier, and 50 denier gel spun polyethylene fibers; (b) 70 and 140 denier nylon fibers; or (c) 70 denier polyester fibers. The lines were then tested by anglers with experience in flyfishing and in determining the performance of flyfishing lines.

Casting accuracy was improved as well as "shooting." Production scrap from centering and surface blemishes was greatly reduced. The resulting lines were flexible and well suited for flyfishing.

The performance of the composite was better than conventional flylines in several areas. The higher level of plasticizer and microballoons improved flexibility and flotation. The low stretch overbraid greatly improved pick up off the water.

Example 2

Flylines with very low stretch (i.e., less than about 10%) can be made from an aramid core of 200–800 denier fiber. A tapered, microballoon-containing plastisol layer would be applied directly to the aramid fiber to form the core of the line. The microballoon level in the plastisol would be adjusted to compensate for the density of the aramid fiber or fibers in the core. An overbraid of nylon (16 carriers of about 70 denier fibers) would then be applied followed by a final overcoat of ethylene-acrylic acid copolymer or polyurethane to prevent unraveling.

Example 3

An alternative construction for a very low stretch flyline uses a standard monofilament core and an overbraid of a mixture of braided polyester fibers and unbraided warp fibers of gel spun polyethylene running parallel to the flyline axis. The line exhibited a 5.5% elongation to break.

We claim:

1. A composite flyline exhibiting a tip end and a line body, said flyline comprising:
   a core line of uniform diameter;
   a first layer comprising polyvinyl chloride plastisol over said core line, said first layer exhibiting a cross sectional shape useful for flyfishing; and
   an overbraid second layer covering said first layer, said second layer comprising a braid of at least 6 fibers of an abrasion resistant material.

2. A composite flyline according to claim 1 wherein said core line is a nylon monofilament or aramid fiber.

3. A composite flyline according to claim 1 wherein said first layer comprises:
   a buoyant first layer over said core line, said first layer exhibiting a tapering cross sectional thickness at a rate sufficient to provide a tapered line useful for flyfishing.

4. A composite flyline according to claim 1 wherein said first layer is made from polyvinyl chloride plastisol and contains (a) a plasticizer in a quantity sufficient to render said layer flexible; and (b) glass microballoons in a quantity sufficient to make said composite flyline buoyant in fresh water.

5. A composite flyline according to claim 1 wherein said line exhibits a neutral density in fresh water.

6. A composite flyline according to claim 1 wherein said line sinks in fresh water.

7. A composite flyline according to claim 1 wherein said tip end sinks in and said body floats.

8. A composite flyline according to claim 1 wherein said overbraid second layer is made from fibers made of a material selected from the group consisting of nylons, gel spun polyolefins, and polyesters.

9. A composite flyline according to claim 8 wherein said overbraid second layer further comprises a warp strand in the braid.

10. A composite flyline as in claim 1 further comprising:
    a third coating over said second coating, wherein said third coating is a coloring agent, a low friction material, or an abrasion resistant polymer.

11. A composite flyline comprising:
    a monofilament core line of uniform diameter and free of externally applied adhesive;
    a first layer over said core line and comprising polyvinyl chloride and a plasticizer, said first layer exhibiting a tapering cross sectional shape useful for flyfishing; and
    an overbraid second layer covering said first layer, said second layer comprising a braid of 8–64 fibers of either a gel spun polyolefin or nylon.

* * * * *